June 25, 1929.  J. C. GROBLE  1,718,290
AUTOMATIC PRESSURE REGULATOR
Filed March 17, 1928   2 Sheets-Sheet 1
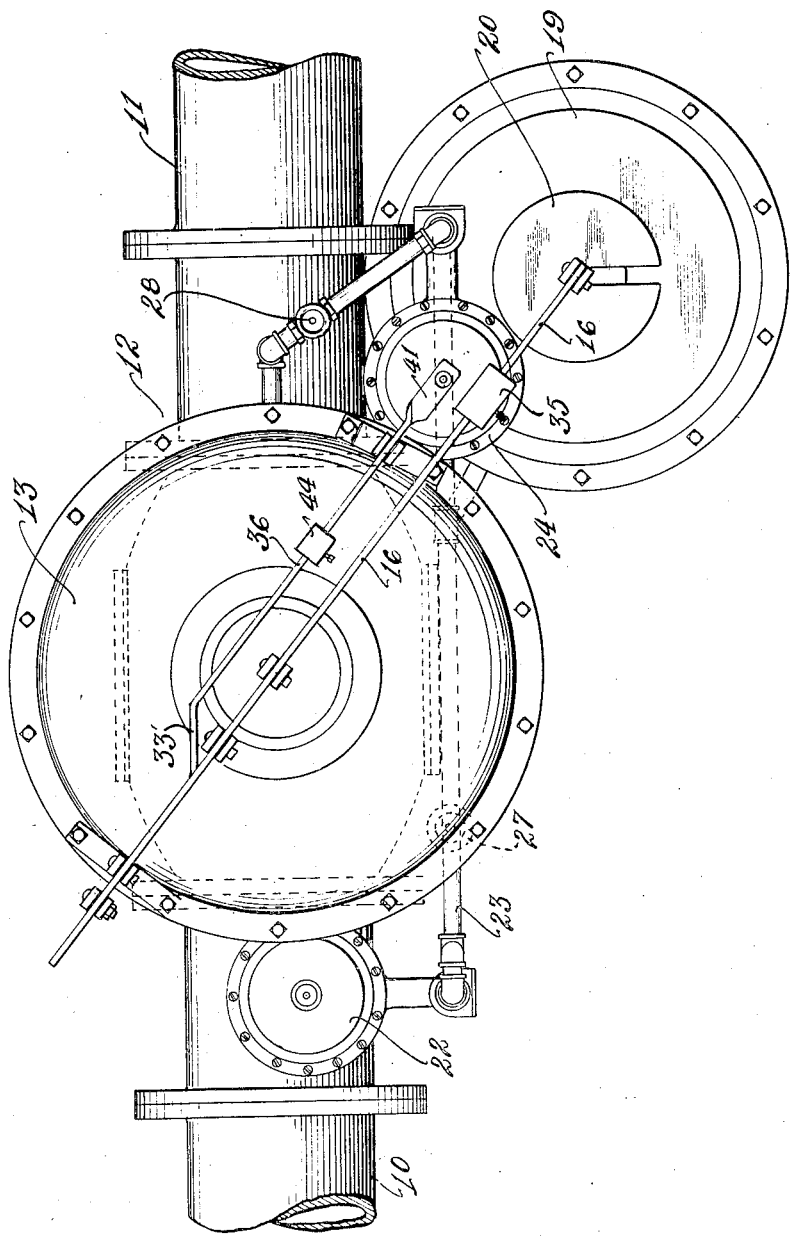
INVENTOR
Jacob C. Groble
by Charles Miller Attys

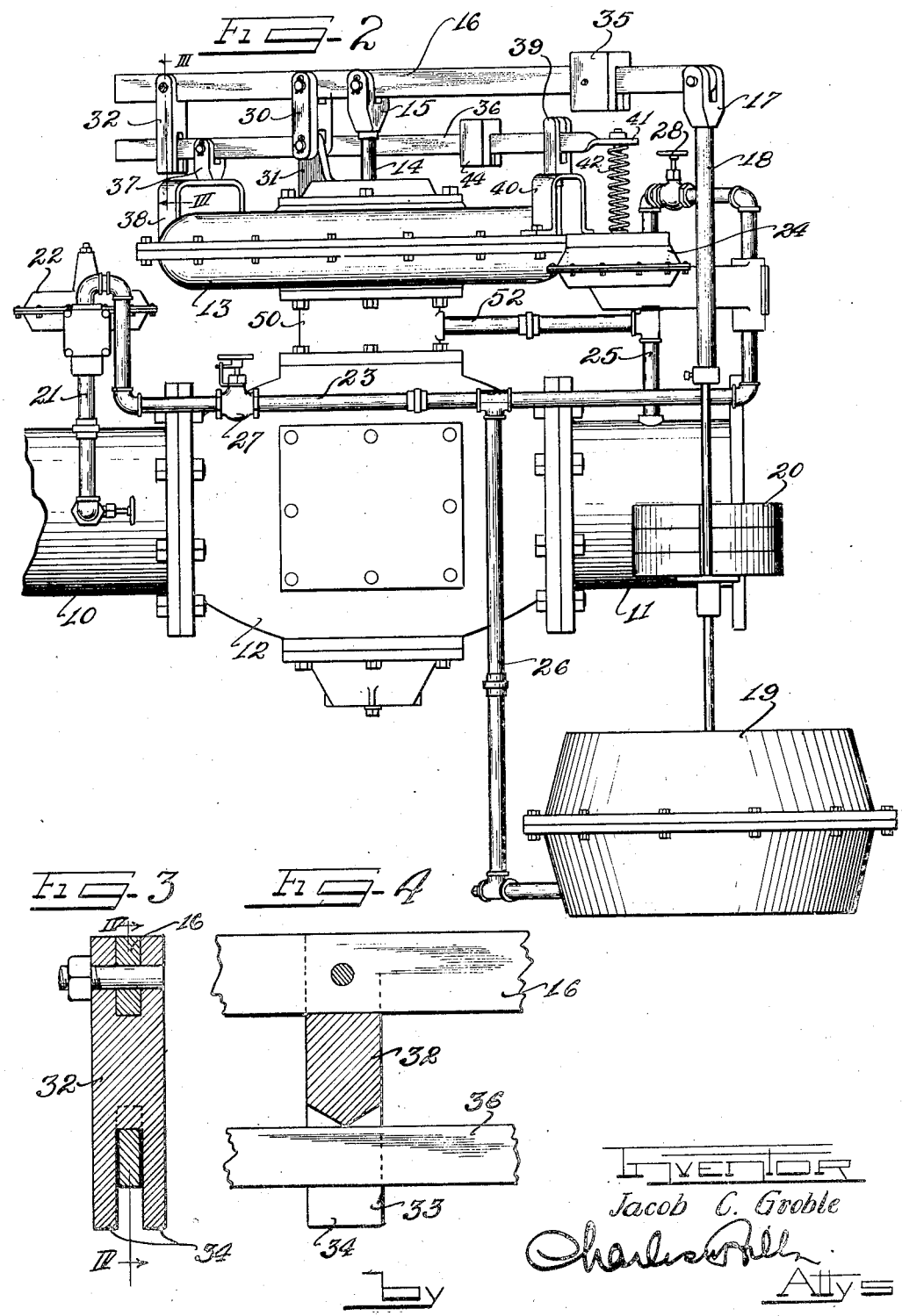

Patented June 25, 1929.

1,718,290

UNITED STATES PATENT OFFICE.

JACOB C. GROBLE, OF ANDERSON, INDIANA, ASSIGNOR TO GROBLE GAS REGULATOR CO., OF ANDERSON, INDIANA, A CORPORATION OF INDIANA.

AUTOMATIC PRESSURE REGULATOR.

Application filed March 17, 1928. Serial No. 262,579.

My invention relates in general to fluid pressure control systems, and more particularly to a pressure regulator system especially adapted for use as a district station governor for gas mains and the like.

An object of the present invention is to provide an improved fluid pressure regulator of the same general type as that disclosed in the copending patent application of Groble, Pollock, and Groble, Serial No. 224,966, filed October 8th, 1927.

Another object of this invention resides in the provision of a pressure regulator system including a main regulator, a high pressure auxiliary regulator, a low pressure auxiliary regulator, and automatic means for increasing the outlet pressure of the low pressure auxiliary or secondary regulator so as to enable the system to handle an abnormal demand for fluid.

Still another object of the invention resides in the provision of a secondary lever adapted to be associated with the control lever of a fluid pressure regulator system in such a manner that it will increase the mechanical pressure upon the low pressure auxiliary or secondary regulator, whereby the outlet pressure of this regulator may be increased to meet increased or abnormal demands for fluid substantially instantaneously.

In accordance with the general features of the present invention I provide an improved fluid pressure regulating system including an auxiliary weighted lever associated with the primary or control lever of the system in such a manner that upon the downward movement of the primary lever the weight on the auxiliary or secondary lever will cause it to travel downward at a greater rate of travel than that of the primary lever, whereby the outlet pressure of the low pressure secondary or auxiliary regulator of the system is increased. This secondary lever has a much smaller range of movement than the primary lever and will have reached its lowermost position before the primary lever has completed its downward travel. In other words, this means that once the secondary lever has been operated through the weight to impose additional pressure upon the low pressure auxiliary regulator, the primary lever is free to act independently of the secondary lever until it rises a sufficient amount to come in contact with the secondary lever. Immediately upon the secondary lever being contacted by the primary lever, the former is moved upwardly with a greater ratio of travel than the latter thereby releasing the pressure on the low pressure auxiliary regulator and thus causing the outlet pressure of the system to be reduced to the minimum to which it is set to normally operate.

Other objects and advantages of my invention will more fully appear from the following detailed description taken in connection with the accompanying drawings which illustrate a single embodiment thereof and in which:

Figure 1 is a plan view of a fluid pressure regulating system embodying the features of this invention;

Figure 2 is a fragmentary side view of the pressure regulating system shown in Figure 1;

Figure 3 is an enlarged detail sectional view taken on substantially the line III—III of Figure 2 looking in the direction indicated by the arrows and showing the manner in which the free ends of the primary and secondary levers are associated together, and Figure 4 is a fragmentary side view, partly in section, of the structure shown in Figure 3.

In the drawings:

Like reference characters designate similar parts throughout the several views. The reference characters 10 and 11 designate generally the inlet and outlet ends of a pressure regulating system to which my invention is applicable. Attention is directed to the fact that the system shown embodies the features and principles of the well-known Reynolds regulator and hence operates in substantially the same way as the Reynolds regulator, with the exception of the improvements comprising the present invention. Positioned between the inlet and outlet is a main regulator designated generally by the reference character 12 above which is disposed a main regulator diaphragm bowl 13. The diaphragm in the bowl 13 is connected to the lower end of a rod 14, the upper end of which is forked at 15. This forked end 15 is pivotally connected to an intermediate portion of a main regulator lever 16, one end of which is pivotally connected to the forked upper end 17 of a rod 18 having its lower end connected to the diaphragm in a master bowl 19. The rod 18 carries a plurality of weights 20 for weighting the diaphragm in bowl 19.

The inlet 10 has connected to it one end of a pipeline 21, the other end of which is connected to the inlet side of a high pressure auxiliary or secondary regulator 22. The outlet side of this pressure regulator 22 is connected by a pipeline 23 to the inlet side of the low pressure auxiliary or secondary regulator 24. The outlet side of this regulator 24 is connected by a pipeline 25 to the outlet 11 of the system.

An intermediate portion of the pipeline 23 is disposed in communication with the upper end of a pipeline 26, the lower end of which is disposed in communication with the lower chamber of the bowl 19. A hand valve 27 is connected to the pipeline 23 on the high pressure side of the line 26 and is adapted to be manually operated to control the flow of fluid to the low pressure secondary regulator. The inlet side of the low pressure auxiliary regulator has connected to it a hand valve 28 adapted to control the amount of pressure exerted on the bowl 19 by the low pressure regulator.

The system thus far described is conventional and is similar to the well-known Reynolds regulator. I shall now proceed to describe in detail my improved auxiliary lever adapted for association with the primary lever 16 for the purpose of controlling the operation of the low pressure auxiliary regulator 24.

The primary lever 16 has pivotally connected to an intermediate portion thereof, adjacent the forked end 15 of rod 14, a link 30, both ends of which are bifurcated. The upper end of this link is pivotally connected to the primary lever 16 and its lower end is pivotally connected to a bracket 31 secured to the top of the main regulator bowl 13. It will be noted that one end of the primary lever 16 extends past the link 30 and is pivotally connected to the bifurcated upper end of a fork member 32. The lower end of this member 32, as shown in Figures 3 and 4, is bifurcated or forked as indicated at 33 thus providing spaced legs 34. The lever 16 carries a shiftable weight 35 which is adapted to exert pressure on the diaphragm in bowl 19 through rod 18.

A secondary or auxiliary lever 36 is disposed below the primary lever 16 and is pivotally connected to a bifurcated support 37 secured to a bracket 38 mounted on the main regulator bowl 13. It will be noted that the end of the lever 36 associated with the bifurcated support 37 extends a slight ways past the same and through the space separating the legs 34 of the bifurcated lower end of forked member 32. The other end of the secondary lever 36 extends through a forked member 39 secured to a bracket 40 carried by the main regulator bowl 13. In Figure 1 it will be noted that the auxiliary lever 36 is offset as indicated at 33' in order for one of its ends to be in alignment with the forked member 39 and with the center of the low pressure auxiliary regulator 24.

This end of the secondary lever 36 is twisted to provide a flat portion 41 to which is secured the upper end of a spring 42 acting on the diaphragm of the low pressure auxiliary regulator 24. It will be evident that if the spring 42 is compressed or moved downwardly by the downward movement of the secondary lever 36, it will result in this low pressure regulator having a greater outlet presusre. The secondary lever carries a shiftable weight 44 disposed between the forked members or supports 37 and 39.

It will be noted that the main regulator housing 12 is connected to the bowl 13 by a flanged tube 50 which has connected to it one end of a pipe 52, the other end of which is connected to the pipeline 25 connecting the discharge of the auxiliary regulator 24 to the outlet 11. This pipeline 52 comprises an equalizer pipe and serves to relieve the chamber in the tube 50 from any gas pockets as is fully disclosed in the previously mentioned copending patent application, and does not per se constitute part of the present invention.

The operation of the system above described is as follows: As the pressure in the outlet side 11 of the system drops it means a corresponding drop in pressure will take place in the auxiliary low pressure regulator 24 and in the lower part of the bowl 19 since an increasing or greater amount of fluid will flow from pipe 23 directly to the low pressure regulator 24. This means that the weights 35 and 20 will cause rod 18 to gradually move downwardly, thus moving with it the primary lever 16 which increases the opening of the valve members in the main regulator 12. Downward movement of one end of the primary lever 16 causes its other end including the forked member 32 to move upwardly. This upward movement of forked member 32 allows the larger end of secondary or auxiliary lever 36 to move downwardly under the effect of the weight 44 which has been previously set to a predetermined position so as to cause it to exert a given pressure upon spring 42. Obviously downward movement of secondary lever 36 increases the pressure upon spring 42, thus increasing the outlet pressure of the low pressure auxiliary regulator 24. It will be evident that the secondary lever 36 will have a greater rate of downward travel than the primary lever 16 due to the weight 44 which at all times serves to place the proper tension on the spring 42. Primary lever 16 can continue to travel downwardly until the valves in the main regulator 12 are wide open, at which time the secondary lever 36 will be exerting maximum pressure on spring 42 and will be resting in the bottom of the forked member 39. Moreover, since the forked member 32 is disconnected from the secondary lever 36, it will mean that the primary lever will be free to act independently of the secondary lever until such time as the primary lever rises and causes the forked member 32 to come into contact with the associated end of secondary lever 36 which will result in the secondary lever being forced upwardly at a greater rate of travel than the primary lever thereby releasing the pressure on the spring 42 and reducing the pressure in the auxiliary low pressure regulator 24 to the predetermined minimum at which it is set to operate.

From the foregoing it is apparent that the auxiliary lever 36 will function upon an abnormal demand upon the system to cause the volume of fluid delivered through the main regulator to be increased so that a substantially constant outlet pressure can be maintained at all times irrespective of the demand. In other words, upon an abnormal demand upon the system, the secondary lever 36 will operate so as to increase the range of operation of the low pressure regulator whereby the increased demands can be fully supplied. When the demands are again normal, the lever 36 is returned to its normal position thus relieving the low pressure regulator of pressure and enabling it to function to cause a predetermined amount of fluid to be delivered to the outlet so that a substantially constant outlet pressure can be maintained.

Now, of course, it is to be understood that although I have illustrated and described in detail the preferred form of my invention, the invention is not to be thus limited, but only in so far as defined by the scope and spirit of the appended claims.

I claim as my invention:

1. In a fluid pressure regulator, the combination with a main regulator, an auxiliary low pressure regulator, a master bowl and a main lever connecting the diaphragms of said main pressure regulator and bowl, of a secondary lever associated with said main lever and connected with said low pressure regulator for actuating it to compensate for variations in outlet pressure, and a lost motion connection between said levers for enabling said main lever to at predetermined times operate said secondary lever.

2. In a fluid pressure regulator, the combination with a main regulator, an auxiliary low pressure regulator, a master bowl and a main lever connecting the diaphragms of said main pressure regulator and bowl, of a secondary lever associated with said main lever and connected with said low pressure regulator for compensating for variations in outlet pressure, a lost motion connection between said levers, and a weight on said secondary lever adapted to cause said secondary lever to have a greater rate of travel than said main lever.

3. In a fluid pressure regulator, the combination with a main regulator, an auxiliary low pressure regulator, a master bowl and a main lever connecting the diaphragm of said main pressure regulator and bowl, of a secondary lever operatively associated with said main lever and said auxiliary regulator, and a lost motion connection between the two levers whereby said auxiliary lever will be actuated more rapidly than said main lever and will after a predetermined degree of movement remain stationary during further movement of the main lever.

4. In combination with a control valve having a main valve beam and a loaded regulator for the main valve, mechanism associated with said regulator and having a lost motion connection with said beam to enable said valve beam at certain valve openings to change the adjustment of said regulator.

5. In combination with a control valve having a main valve beam and a loaded regulator for the main valve, mechanism associated with said regulator and having a lost motion connection with said beam to enable said valve beam at certain valve openings to change the adjustment of said regulator, said mechanism including a secondary beam and a shiftable weight thereon.

6. In combination with a control valve having a main valve beam and a loaded regulator for the main valve, mechanism associated with said beam including a secondary beam having a lost motion connection with the main beam at one end and having its other end connected to the regulator so as to change the adjustment of the regulator at certain valve openings, and a slidable weight on said secondary beam for adjusting the action of said beam on said regulator.

7. In combination with a control valve having a main valve beam and a regulator for the main valve, mechanism associated with the main valve beam for varying the adjustment of said regulator including an auxiliary beam and a weight slidable thereon, a support for one end of the auxiliary beam carried by the control valve, and a member connected to the main beam adapted to fit over one end of the auxiliary beam, the other end of the auxiliary beam being adjustably connected to the regulator, said auxiliary beam being arranged so that upon downward movement of the main beam the weight on the auxiliary beam becomes effective to force it downwardly whereby the adjustment of the regulator is changed.

8. In combination with a Reynolds type pressure controlling valve having a main valve beam and a regulator controlling the operation thereof, a connection between the main valve beam and the regulator for changing the adjustment of the regulator to increase the pressure on the low pressure side of the valve at large valve openings, said connection including an auxiliary beam and a weight thereon, said beam being movable by said main beam, said auxiliary beam being set into motion by and having a greater rate of travel than the main beam due to the weight thereon.

9. In a fluid pressure regulator, the combination of a main regulator, an auxiliary low pressure regulator, a lever operatively connected to said main regulator, of a variable connection between said lever and auxiliary regulator for causing the adjustment of the auxiliary regulator to be varied proportionately to the opening of the main regulator, said lever having a member connected thereto, said variable connection comprising an auxiliary lever, one end of which is adapted to be engaged by the depending portion of said member and the other end of which is adapted for connection to said auxiliary regulator to vary the adjustment thereof, and a weight slidably mounted on said auxiliary lever for causing said lever to move at a greater rate than the main lever upon a downward movement of the main lever, said member constituting a lost motion connection between the two levers.

10. In a fluid pressure regulator, the combination with a main regulator, an auxiliary low pressure regulator, a master bowl, a main lever fulcrumed adjacent one end of said main regulator and having one free end connected with said bowl, and means for connecting said lever between said free end and its fulcrum point with said main regulator, of an auxiliary lever fulcrumed adjacent one end on said main regulator, a lost motion connection between said end of the auxiliary lever and the other end of said main lever, an adjustable spring connection between the other end of said auxiliary lever and said auxiliary regulator so that said last mentioned end thereof will have a greater amount of movement than the connection between said main lever and main regulator, and a weight slidable on said auxiliary lever adapted to force said lever downwardly immediately upon downward movement of said main lever, said auxiliary lever being adapted to be returned to its normal position by upward movement of said main lever through the lost motion connection.

In testimony whereof I have hereunto subscribed my name at Anderson, Ind., county of Madison.

JACOB C. GROBLE.